H. MAIMIN.
MOTOR BRACKET.
APPLICATION FILED NOV. 13, 1919.
1,377,016.
Patented May 3, 1921.
2 SHEETS—SHEET 1.
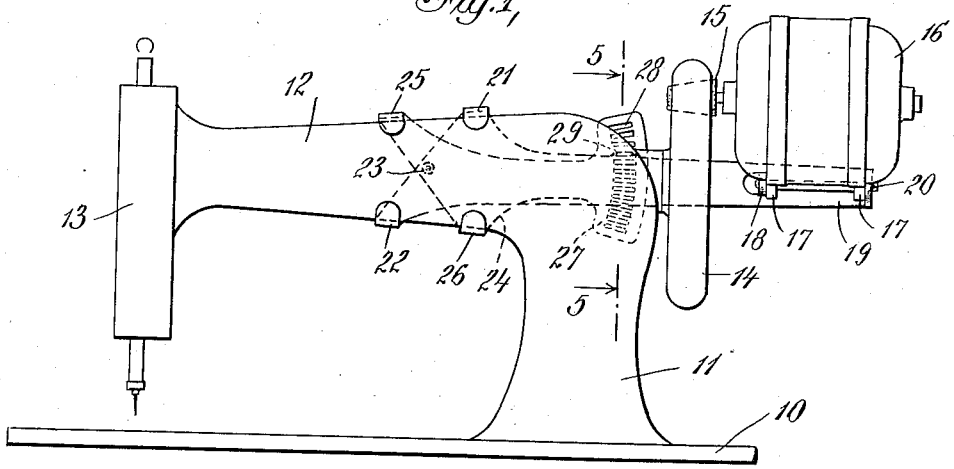
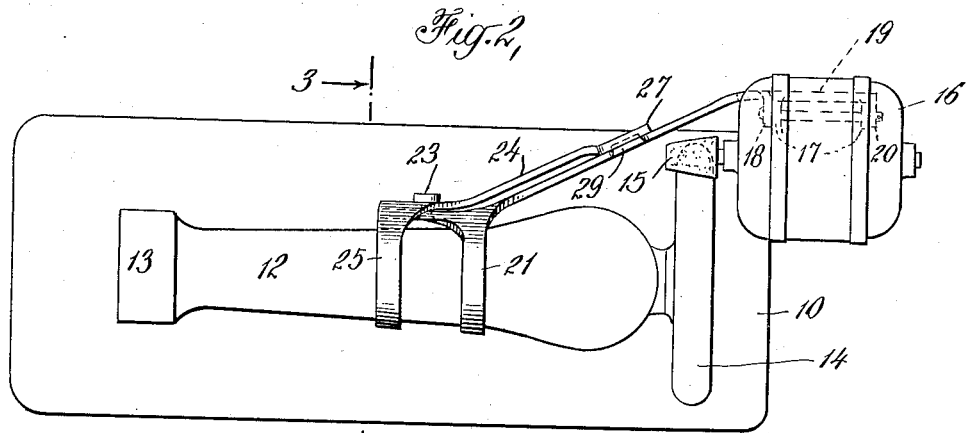
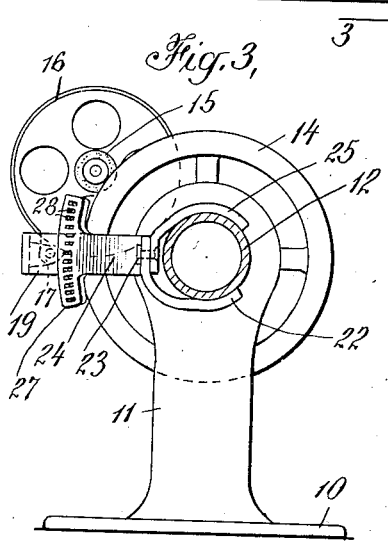
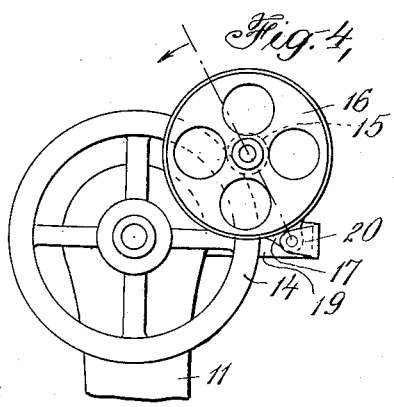
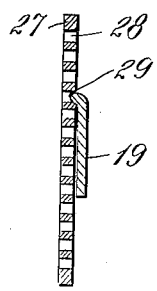
Inventor
Hyman Maimin
By his Attorneys
Pennie, Davis, Marvin & Edmonds

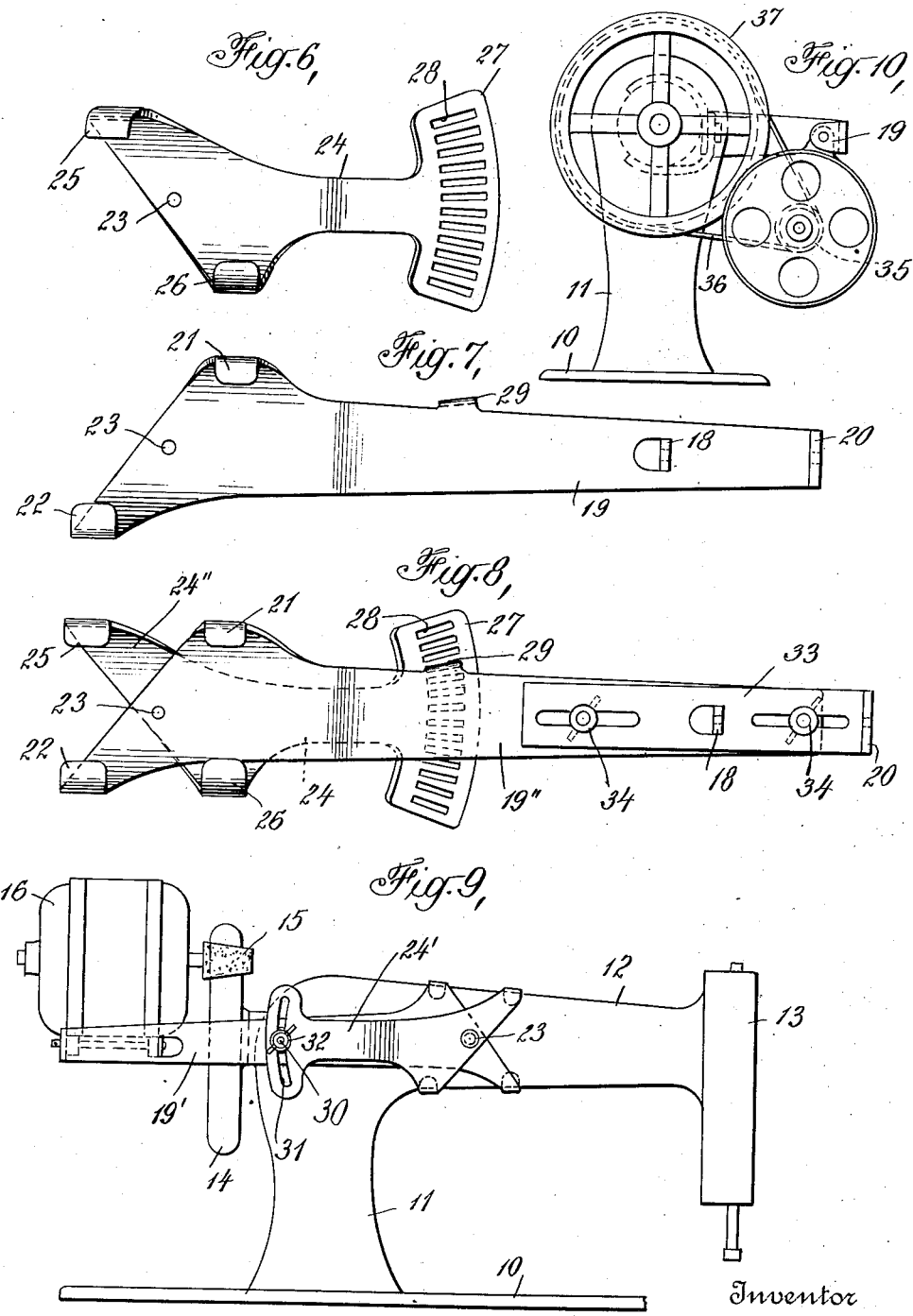

UNITED STATES PATENT OFFICE.

HYMAN MAIMIN, OF NEW YORK, N. Y.

MOTOR-BRACKET.

1,377,016.

Specification of Letters Patent.   Patented May 3, 1921.

Application filed November 13, 1919. Serial No. 337,643.

*To all whom it may concern:*

Be it known that I, HYMAN MAIMIN, a citizen of the United States, residing at New York city, in the county of New York, State of New York, have invented certain new and useful Improvements in Motor-Brackets; and I do hereby declare the following to be a full, clear, and exact description of the invention, such as will enable others skilled in the art to which it appertains to make and use the same.

This invention relates to brackets for supporting motors in operative relation to mechanisms adapted to be driven by the motors.

While the device is of general utility, it is particularly adapted for use in supporting upon the frames of sewing machines the small electric motors now provided for driving the machines. A number of different arrangements are in use for mounting motors upon sewing machines. In some cases the motors are mounted upon or under the tables of the machines and belts are used for connecting them to the driving wheels of the machines. In other cases the motors are mounted upon brackets which are attached to the frames of the machines in the vicinity of their driving wheels, the latter being connected to the motors by belts or driven directly by engagement with a friction wheel on the shaft of the motor. In all of these arrangements it is necessary to make special preparations for attaching the motors, or the brackets upon which the motors are mounted, to the tables or frames of the machines by drilling holes in these parts of the machines to receive screws or bolts. The holes must be accurately placed to correspond to the location of the screws or bolts in the motors or brackets. Different forms of brackets must be provided for different styles and makes of machines. These and other requirements render it troublesome and inconvenient for the ordinary user of a sewing machine to apply a motor thereto, and the expense of sending the machine away to have a motor installed may cost more than the motor itself.

In an attempt to overcome the disadvantages attending the attachment of motors directly to the tables or frames of sewing machines, devices have been constructed comprising pedestals provided with friction members for holding them in place on the tables of the machines, and upon which the motors are mounted with some kind of a yielding arrangement for holding the pulleys of the motors in engagement with the driving wheels of the machines. Such devices are more or less complicated, comprises a number of extra parts, and the presence of the pedestals upon the tables acts as an obstruction and interferes with the use of the tables for holding the work.

In accordance with the present invention there is provided a bracket consisting primarily of a supporting member adapted to be brought into engagement with the top and bottom of the horizontal arm of the frame of a sewing machine and be held in place by the weight of the motor which is mounted upon the free end of the member. In order more securely to hold the supporting member in place and particularly to prevent it from becoming dislodged by vibration or by an upward thrust tending to lift the motor and thus release the member, there is associated with the member a locking member adapted to engage the top and bottom of the horizontal arm of the frame and arranged to be connected to the supporting member in such a manner as to prevent any displacement of the latter. The motor may be attached to the supporting member in such relation to the driving wheel of the sewing machine that a friction pulley on the shaft of the motor will be held in engagement with the driving wheel by the weight of the motor, or a belt may be used for connecting the motor to the driving wheel, the tension of the belt being maintained by the weight of the motor or the elasticity of the supporting member. These arrangements thus avoid the use of springs or other devices commonly employed for holding a motor in operative relation to a machine wheel, and the construction of the device is correspondingly cheapened and simplified. The device is of such a character that it may be applied to any form of sewing machine without requiring any special preparations, such as the drilling of holes in the frame or special adjustments.

The particular nature of the invention, as well as other objects and advantages thereof, will appear more clearly from a description of certain preferred embodiments as shown in the accompanying drawings, in which—

Figure 1 is a side elevation of the frame of a sewing machine with the device in place thereon;

Fig. 2 is a plan view of the same;

Fig. 3 is a view in section along the line 3—3 of Fig. 2;

Fig. 4 is an end view of the device;

Fig. 5 is a detail view in section along the line 5—5 of Fig. 1;

Fig. 6 is an enlarged view of the supporting member;

Fig. 7 is a corresponding view of the locking member;

Fig. 8 is a view of a modified form of device;

Fig. 9 is a view of a sewing machine with still another form of device mounted thereon; and Fig. 10 is an end view of an arrangement in which a belt drive is employed.

In the drawings, 10 represents the base of a sewing machine frame, comprising a vertical standard 11 and a horizontal arm 12, carrying at its outer end a head 13 within which the mechanism for reciprocating the needle is mounted, this mechanism being driven by a wheel 14, which may be provided with a friction edge adapted to coöperate with a friction pulley 15 on the shaft of a small driving motor 16. The motor casing is provided with lugs 17 by which it may be attached to lugs 18 of a supporting member 19 by means of a pin 20, or in any other suitable manner.

The supporting member 19 is bent inwardly as shown most clearly in Fig. 2 and is provided at its inner end with upper and lower extensions 21 and 22, respectively, adapted to fit over the top and bottom of the horizontal arm 12 of the frame. The weight of the motor upon the end of the member will produce a turning moment which will be opposed by the engagement of the upper and lower extensions with the frame, so that the member may be held in place upon the frame without any other means. In practice, however, I prefer to attach to the supporting member by means of a pivot 23, a locking member 24, which is provided with upper and lower extensions 25 and 26, respectively, adapted to engage the top and bottom of the horizontal arm. In order that the locking member may coöperate with the supporting member, in holding it more securely upon the machine frame, it is necessary that they be clamped together, and for this purpose the outer end of member 24 may be provided with an extension 27 having a number of slots 28 therein. The member 19 is provided at its upper edge with a lug 29 adapted to enter any one of the slots 28 according to the relation between the members 19 and 24. It will be understood, however, that these coöperating locking elements may be interchanged so that the slots are formed in the member 19 while the lug projects from the end of member 24, or that any other suitable arrangement may be provided for holding the members together. In Fig. 9 there is illustrated a modified construction in which the supporting member 19' is provided with a pin 30, adapted to enter a curved slot 31 in the enlarged end of the coöperating member 24'. The pin is provided with a wing nut 32 by means of which the two members may be locked together.

In the preferred embodiment of the invention, it is intended that the supporting member 19 shall be so arranged that when the bracket is in place upon the frame of the machine, the motor 16 will be held by gravity with its driving pulley 15 in engagement with the wheel 14 of the machine. The pulley may be of any suitable form adapted to coöperate most effectively with the machine wheel to transmit power thereto. In the embodiments of the invention described above the driving wheels of the motors are arranged to engage the upper part of the driving wheels of the machines, but by a suitable change in the shape of the supporting member 19, the motors may occupy other positions with relation to the driving wheels.

The device described above will serve to hold the motor in operative relation to the frame of the machine, but in case the device is applied to a frame in which the arm 12 differs considerably in size from the arm for which the device is particularly adapted, the motor may not occupy the correct position to bring its driving wheel into engagement with the wheel of the machine. To provide for such cases the supporting member 19 may be provided with an adjustable extension to which the motor may be attached. In Fig. 8 there is shown such a modification of the device in which the motor is attached to a member 33 which is adjustably mounted upon the supporting member 19" by pin and slot connections 34, or in any other suitable manner. The other coöperating member 24" is similar to the corresponding member of the modifications described above and may be clamped to member 19" by a lug and slot arrangement, as shown in Fig. 8, or the pin and slot connection of Fig. 9 may be employed.

Instead of arranging the motor so that its driving wheel engages the wheel of the machine, the motor may be arranged to drive the machine by a belt connection. In Fig. 10 there is shown an arrangement of this character in which the motor is suspended from the supporting member 19, and its shaft is provided with a pulley 35 connected by means of a belt 36 to a driving pulley 37 on the shaft of the machine. The parts should preferably be arranged so that the motor is drawn toward the pulley of the machine to cause the weight of the motor to maintain the required tension in the belt. As a modification of the arrangement just described the motor may be rigidly attached to the supporting member 19, and the driving belt will be of such length that the motor and the free end of the supporting member will be drawn slightly toward the pulley of the machine so that the resiliency of the supporting member will maintain sufficient tension in the driving belt.

When it is desired to apply to the frame of a sewing machine the form of device illustrated in Fig. 1, the two members 19 and 24 are separated sufficiently to disengage the lug 29 from the slotted end of member 24. The members may then be swung about the pivot 23 to open them sufficiently to permit their respective extensions 21 and 22 and 25 and 26 to pass over the top and bottom of the arm of the frame, after which the bracket may be clamped in position by swinging the members about the pivot 23 and drawing the device along the frame until the extensions engage the top and bottom of the arm. By allowing the lug 29 to enter one of the slots 28, the bracket will then be firmly positioned upon the frame of the machine with the driving wheel 15 of the motor in engagement with the wheel 14 of the machine, and the friction between these two members will be sufficient to transmit motion from the former to the latter. At the same time the motor may yield as may be necessary on account of irregularities in the surfaces of the driving wheels.

The form of device shown in Fig. 9 is applied to the frame of a machine in substantially the same manner as is the device of the preceding figures, except that the locking effect between the two members is obtained by manipulation of the wing nut 32. The form of device shown in Fig. 8 is particularly adapted for use in those cases where it may be necessary to attach the device to different types of machines in which there may be considerable variation in the sizes of the arms of the frames. The device may be attached to the frame, and the extension 33 adjusted to bring the motor pulley into correct relation to the wheel of the machine. While each of the members 19 and 24 has been shown as provided with upper and lower extensions to engage the frame, the device may be still further modified by omitting from each of the members one of the extensions, the two extensions omitted being upon opposite sides of the frame, so that there results a two-piece bracket having upper and lower extensions adapted to engage the top and bottom of the machine frame, so that the bracket will be held upon the frame by the weight of the motor acting upon the members. It will also be understood that the invention may be embodied in other forms, and that various other changes in the details of construction may be made without departing from the principle of the invention as defined in the appended claims.

I claim:

1. The combination with the frame and wheel of a machine to be driven, of a bracket, a motor pivotally mounted upon the outer end of the bracket and adapted to be held in operative relation to the wheel of the machine by its weight, and means associated with the bracket for engaging opposite sides of the machine frame, whereby the turning moment due to the weight of the motor is opposed and the bracket held upon the frame.

2. The combination with the frame and wheel of a machine to be driven, of a bracket, a motor provided with a driving wheel and mounted upon the bracket in such relation to the wheel of the machine that the driving wheel of the motor is held in operative relation to the wheel of the machine by the weight of the motor, and means associated with the bracket for engaging opposite sides of the machine frame, whereby the turning moment due to the weight of the motor is opposed and the bracket is held upon the frame.

3. The combination with the frame and wheel of a machine to be driven, of a bracket, a member adjustably mounted upon the bracket, a motor mounted upon the adjustable member, means associated with the bracket for engaging opposite sides of the machine frame, whereby the turning moment due to the weight of the motor is opposed and the bracket is held upon the frame, and means for driving the wheel of the machine from the motor.

4. The combination with the frame and wheel of a machine to be driven, of a motor, a bracket comprising a supporting member upon which the motor is mounted and a locking member adapted to be adjustably connected to the supporting member, means associated with the supporting and locking members for engaging the machine frame, whereby the turning moment due to the weight of the motor is opposed and the bracket is held upon the frame, and means for driving the wheel of the machine from the motor.

5. The combination with the frame and wheel of a machine to be driven, of a motor, a supporting member upon which the motor is mounted, means associated with the supporting member for engaging opposite sides of the machine frame, whereby the turning moment due to the weight of the motor is opposed and the supporting member is held upon the frame, a locking member movably mounted upon the supporting member, means associated with the locking member for engaging opposite sides of the machine frame, means for clamping the locking member to the supporting member with its frame engaging means in engagement with the frame, whereby upward movement of the supporting member is prevented, and means for driving the wheel of the machine from the motor.

6. The combination with the frame and wheel of a machine to be driven, of a motor provided with a driving wheel, a bracket adapted to be detachably secured to a horizontal part of the machine frame and provided at one end with upper and lower extensions to engage the top and bottom of the horizontal part of the frame, means for attaching the motor to the other end of the bracket, whereby its weight will hold the bracket in place on the frame with the driving wheel of the motor in engagement with the wheel of the machine, means associated with the bracket and provided with upper and lower extensions to engage the top and bottom of the horizontal part of the frame, and means for clamping the last-named means upon the bracket to prevent displacement of the latter.

7. The combination with the frame and wheel of a machine to be driven, of a motor having a shaft, and a bracket adapted to be detachably secured to the machine frame, comprising a pair of connected members formed at their inner ends to engage the frame, means for holding the members together in clamping relation to the frame, means for attaching the motor to one of the members, and means for driving the wheel of the machine from the shaft of the motor.

8. The combination with the frame and wheel of a machine to be driven, of a motor and its shaft, and a driving wheel thereon, and a bracket adapted to be detachably secured to the machine frame, comprising a pair of connected members formed at their inner ends to engage the frame, means for holding the members together in clamping relation to the frame, and means for attaching the motor to one of the members, said member occupying such a relation to the wheel of the machine as to permit the driving wheel of the motor to be held in engagement with the wheel of the machine by gravity.

9. The combination with the frame and wheel of a machine to be driven, of a motor having a shaft, and a bracket adapted to be detachably secured to the machine frame, comprising a pair of connected swinging members formed at their inner ends to engage the frame, one of said members being provided with a plurality of slots, and the other of said members being provided with a lug adapted to enter any one of the slots to hold the members in clamping relation to the frame, means for attaching the motor to one of the swinging members, and means for driving the wheel of the machine from the shaft of the motor.

10. The combination with the frame and wheel of a machine to be driven, of a motor provided with a driving wheel, a bracket adapted to be detachably secured to a horizontal part of the machine frame and provided at one end with upper and lower extensions to engage the top and bottom of the horizontal part of the frame, and means for attaching the motor to the other end of the bracket, whereby its weight will hold the bracket in place on the frame and maintain the driving wheel of the motor in operative relation to the wheel of the machine.

11. The combination with the frame and wheel of a machine to be driven, of a motor provided with a driving wheel, a bracket adapted to be detachably secured to a horizontal part of the machine frame and provided at one end with upper and lower extensions to engage the top and bottom of the horizontal part of the frame, and means for attaching the motor to the other end of the bracket so that its weight will hold the bracket in place on the frame, and may hold the driving wheel of the motor against the wheel of the machine when the motor is tipped in one direction, or may maintain tension in a belt connection between the driving wheel of the motor and the wheel of the machine when the motor is tipped in the opposite direction.

In testimony whereof I affix my signature.

HYMAN MAIMIN.